United States Patent [19]

Gu

[11] Patent Number: 5,049,296

[45] Date of Patent: Sep. 17, 1991

[54] WORKING MEDIA FOR A THERMODYNAMIC ENGINEERING DEVICE OPERATING IN ACCORDANCE WITH THE GU THERMODYNAMIC CYCLE

[76] Inventor: Chujun Gu, A5 South Rd., of Liuliqiao District, Beijing, China

[21] Appl. No.: 467,775

[22] Filed: Jan. 19, 1990

[30] Foreign Application Priority Data

Jan. 28, 1989 [CN] China ............................. 89100375.4
Dec. 9, 1989 [CN] China ............................. 89109125.4

[51] Int. Cl.$^5$ .............................................. C09K 5/04
[52] U.S. Cl. ........................................ 252/67; 62/114
[58] Field of Search ............................ 252/67; 62/114

[56] References Cited

U.S. PATENT DOCUMENTS

| | | | |
|---|---|---|---|
| 2,641,579 | 6/1953 | Benning | 252/67 |
| 2,641,580 | 6/1953 | Lewis | 252/67 |
| 3,203,194 | 8/1965 | Fuderer | 252/67 |
| 4,303,536 | 12/1981 | Orfeo | 252/67 |
| 4,468,337 | 8/1984 | Ramet et al. | 252/67 |
| 4,603,002 | 7/1986 | Nikolsky et al. | 252/67 |
| 4,810,403 | 3/1989 | Bivens et al. | 252/67 |

FOREIGN PATENT DOCUMENTS

| | | |
|---|---|---|
| 2130556 | 3/1972 | France . |
| 2177785 | 9/1973 | France . |
| 2607144 | 5/1988 | France . |
| 52-70466 | 6/1977 | Japan .................................. 252/67 |
| 54-37328 | 11/1979 | Japan .................................. 252/67 |
| 58-171492 | 10/1983 | Japan .................................. 252/67 |
| 60-173082 | 9/1985 | Japan .................................. 252/67 |
| 63-43991 | 2/1988 | Japan .................................. 252/67 |
| 1-139674 | 6/1989 | Japan .................................. 252/67 |
| 1-139676 | 6/1989 | Japan .................................. 252/67 |

OTHER PUBLICATIONS

Research Disclosure No. 146, Jun. 1976.

Primary Examiner—Paul Lieberman
Assistant Examiner—Christine A. Skane
Attorney, Agent, or Firm—Merchant, Gould, Smith, Edell, Welter & Schmidt

[57] ABSTRACT

A new kind of working medium that can be applied to Gu's thermodynamic cycle system is provided. Such a working medium can enable the curves of the evaporation heat exchange process and the condensation heat exchange process in the thermodynamic cycle system to be non-parallel in the temperature entropy diagram, that is, the isobaric phase transformation curves of such substance are not parallel with each other in the temperature entropy diagram.

5 Claims, 5 Drawing Sheets

WORKING MEDIA FOR A THERMODYNAMIC ENGINEERING DEVICE OPERATING IN ACCORDANCE WITH THE GU THERMODYNAMIC CYCLE

FIELD OF THE INVENTION

The invention relates to the technical field of thermodynamic engineering and thermophysical engineering and, particularly to working media for a thermodynamic engineering device operating in accordance with the Gu thermodynamic cycle.

BACKGROUND OF THE INVENTION

It is well known that the so-called thermodynamic cycle is a closed cycle loop consisting of a plurality of thermodynamic processes. Three or more thermodynamic engineering machines can be connected serially and in parallel to constitute a closed cycle system in which a working medium circulates in order to realize a predetermined thermodynamic cycle.

Through various combinations, one can constitute various thermodynamic cycles from various thermodynamic processes. Each thermodynamic cycle can, according to the circulating direction of the working medium in the system, be classified as a direct cycle or a reverse cycle. In the the temperature entropy diagram, a reverse cycle is when the working medium circulates in the counterclockwise direction.

SUMMARY OF THE INVENTION

According to the invention, there is provided a refrigerant characterized in that the isobaric phase transformation curves for the refrigerant are non-parallel with each other in the temperature entropy diagram.

Such working media enable the thermodynamic cycle to possess at least one sub-cycle stage having the Gu cycle characteristic that the evaporation heat-exchanging process curve and the condensation heat-exchanging process curve are not parallel with each other.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
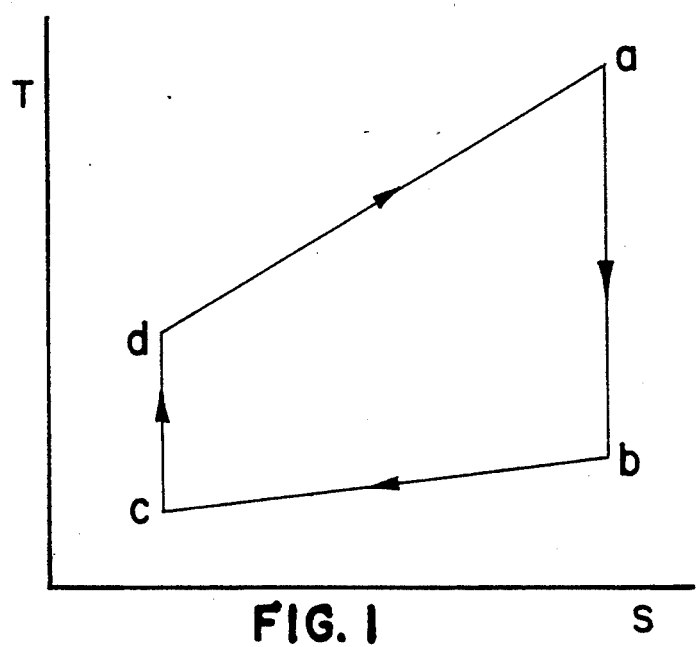
FIG. 1 is a temperature entropy diagram of a direct Gu cycle, in which ab is an isentropic expansion process, bc an isobaric varying temperature exothermic process, cd an isentropic compression process, and da an isobaric varying temperature endothermic process.
Figure 2:
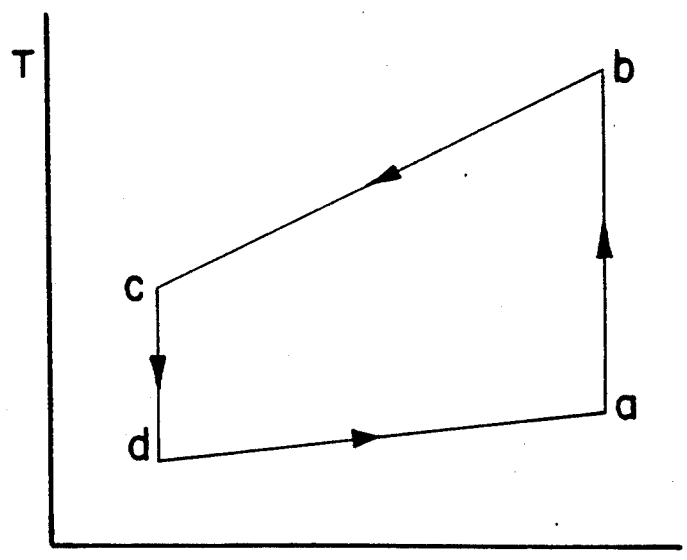
FIG. 2 is the temperature entropy diagram of a first Reverse Gu Cycle, in which ab is an isentropic compression process, bc an isobaric varying temperature exothermic process, cd an isentropic expansion process and da an isobaric varying temperature endothermic process. It is a feature of this reverse cycle that the slope of the exothermic line is greater than that of the endothermic line.
Figure 3:
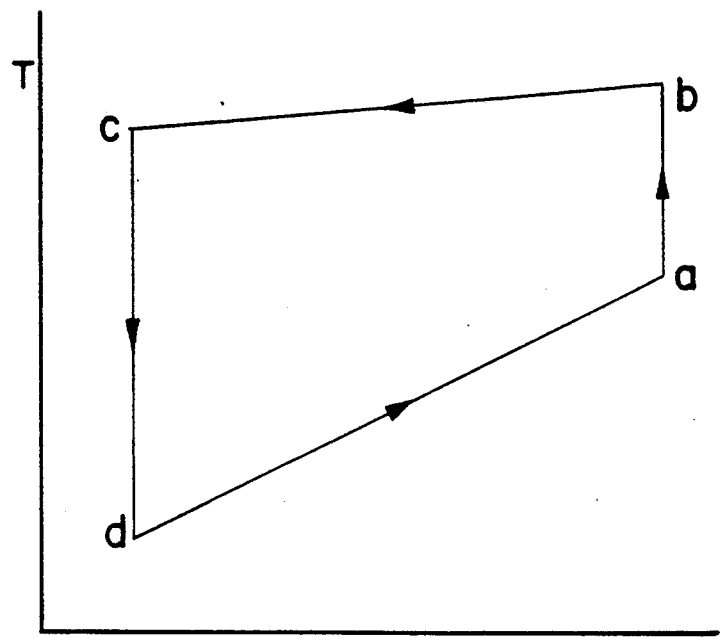
FIG. 3 is the temperature entropy diagram of a second Reverse Gu Cycle, in which ab is an isentropic compression process, bc an isobaric varying temperature exothermic process, cd an isentropic expansion process and da an isobaric varying temperature endothermic process. It is a feature of this reverse cycle that the slope of the exothermic line is smaller than that of the endothermic line.
Figure 4:
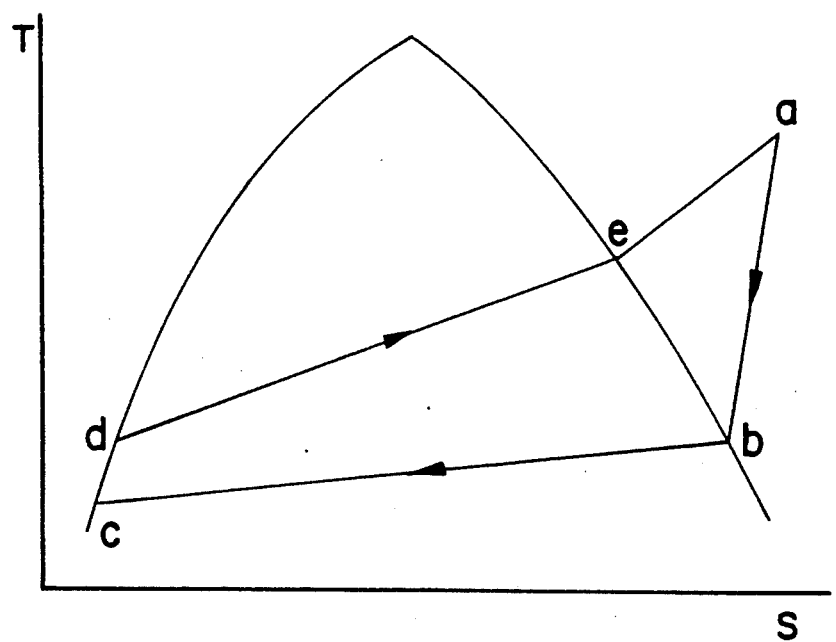
FIG. 4 is the temperature entropy diagram of an actual Gu direct cycle, in which ab is an adiabatic expansion process, bc a varying temperature condensation process, cd an adiabatic compression process and de a varying temperature evaporation process.

The Gu cycle has been proposed generally in the paper, "A heat-power cycle for electricity generation from hot water with non-azeotropic mixtures", Energy vol 13 No. 6 pp 529-536 1988 and a practicable Gu thermodynamic engineering device has been disclosed in Chinese Patent Applications No. 89100212.X and No. 89100375.4. The Gu thermodynamic cycle which is employed in such a thermodynamic engineering device is constituted of an isentropic expansion process, a varying temperature evaporation heat-exchanging process, an isentropic compression process and a varying temperature condensation heat-exchanging process. The evaporation heat-exchanging process curve and the condensation heat-exchanging process curve are not parallel with each other. An actual Gu cycle is constituted of an adiabatic expansion (in the actual process, this being non-isentropic), a varying temperature endothermic process (including a phase transformation endothermic segment and one or two single phase endothermic segments), an adiabatic compression process (the actual process being non-isentropic) and a varying temperature exothermic process (including a phase transformation exothermic segment and one or two single phase exothermic segments), with the phase transformation endothermic segment in the varying temperature endothermic process and the phase transformation exothermic segment in the varying temperature exothermic process being non-parallel with each other in the temperature entropy diagram. With reference to the figures, FIG. 1, shows a Gu direct cycle, FIGS. 2 and 3 show two different Gu reverse cycles and FIG. 4 shows an actual direct cycle. It is clear that in the actual Gu cycle of FIG. 4 there exists an evaporation superheat segment which is omitted in the ideal cycle. A feature of this cycle is that the evaporation process de and the condensation process bc are not parallel. The selection of working medium should be such as to enable the heat process to be optimally matched so that the heat exchanging temperature difference is minimized.

Thermodynamic engineering devices having the above mentioned features of thermodynamic cycle are hereinafter referred to as Gu cycle thermodynamic engineering devices.

It is well known that in the technical field of thermodynamic cycles and thermodynamic engineering devices, the so called working medium is the medium used in the operation of the thermodynamic process. As reverse thermodynamic cycles are often used in refrigerating and air-conditioning systems, the working medium used in the reverse thermodynamic cycle is often called a refrigerant.

Fluids can be classified into three major categories, each of which is defined according to whether its temperatures is varied and how the temperature varies during isobaric phase transformation.

Fluids of the first category are those whose phase transformation temperatures do not vary throughout the entire isobaric phase transformation process. They can be used in Rankine cycle systems.

Fluids of the second category are those whose phase transformation temperatures vary during the isobaric phase transformation process, and the slope of the varying phase transformation temperatures do not vary with different initial phase transformation temperatures. Working media of this category can be used in a parallelogram cycle (also known internationally as Laurent cycle) system. Their characteristics can guarantee that the exothermic and endothermic processes of such thermodynamic cycle are parallel with each other in the temperature entropy diagram.

The others belong to the third category. The characteristic of such a fluid is that the evaporation heat exchange process curve and the condensation heat exchange process curve are not parallel with each other. It has always been considered that fluids of this category have no practical value for thermodynamic cycle devices.

Figure 5:
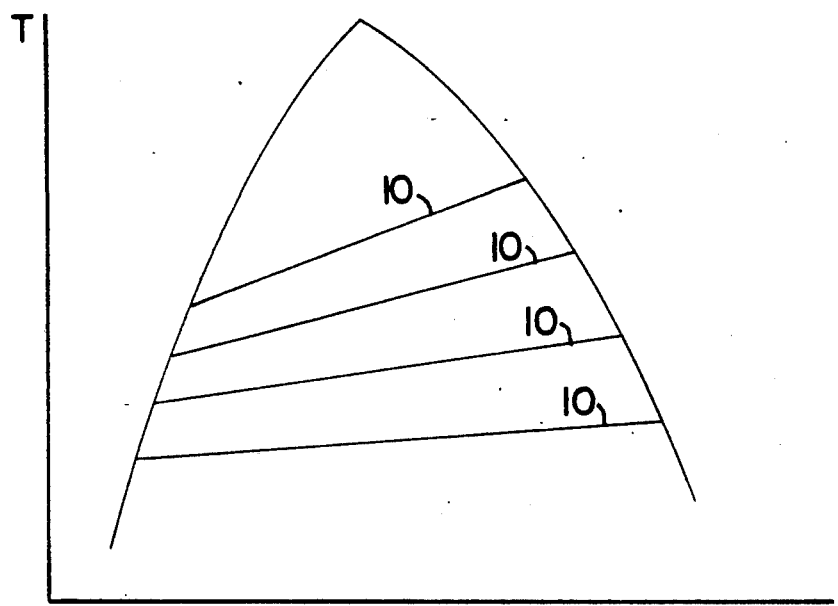
FIG. 5 is the phase transformation diagram of a first kind of Gu cycle working medium. Such phase transformation diagram is characterized in that the slope of the isobaric evaporation process in the temperature entropy diagram is increased with the increase of the initial evaporation temperature.
Figure 6:
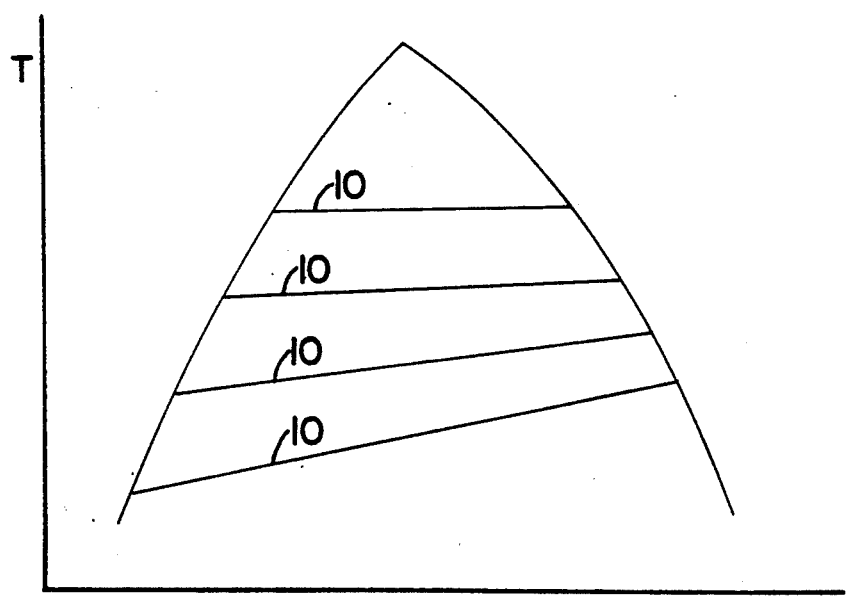
FIG. 6 is the phase transformation diagram of a second kind of Gu cycle working medium. Such a phase transformation diagram is characterized in that the slope of the isobaric evaporation process in the temperature entropy diagram is decreased with the increase of the initial evaporation temperature.

However, if a suitable fluid of this third category was available, this could be used as a working medium to realize the Gu thermodynamic cycle as the characteristic of a working medium of the Gu thermodynamic cycle is that the phase transformation slopes in the temperature entropy diagram vary according to the initial phase transformation temperatures. This ensures that the isobaric phase transformation curves in the temperature entropy diagram are not parallel with each other. In the temperature entropy diagram there are two forms of isobaric phase transformation curves 10 of Gu thermodynamic cycle working media as shown in FIGS. 5 and 6, respectively. It should be emphasized that the isobaric line 5, 10 in FIGS. 5 and 6 may either be a straight curved.

Figure 7:
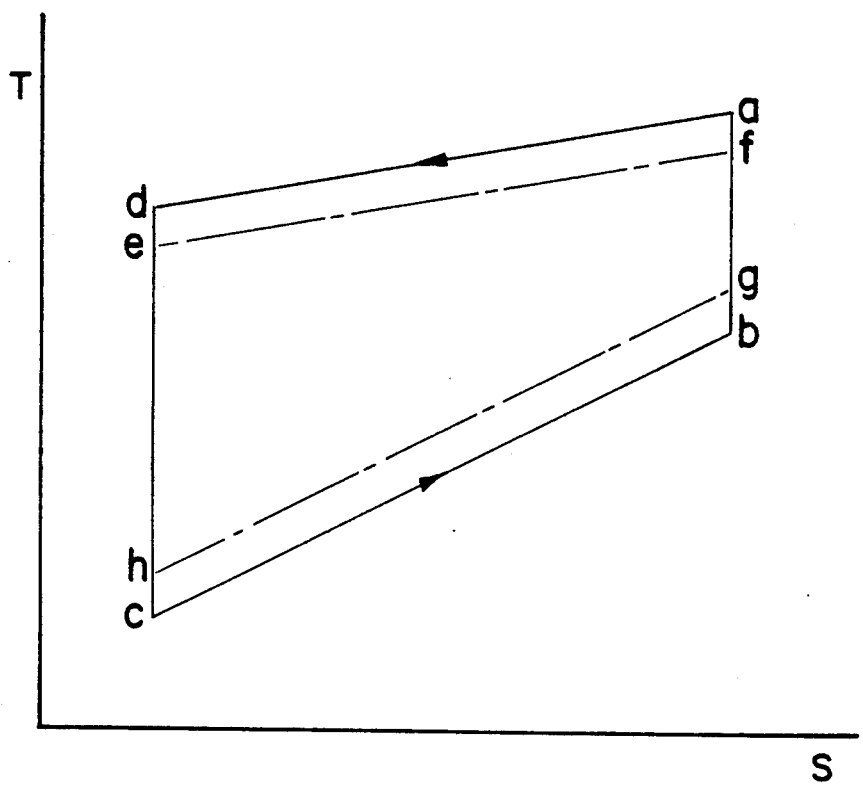
FIG. 7 is the temperature entropy diagram of an optimally matched refrigeration system, in which g is the inlet of cooled water, h the outlet of cooled water, e the inlet of cooling water and f the outlet of cooling water. The heat exchange temperature difference between ad and ef is approximately equal everywhere, and the heat exchange temperature difference between gh and eb is also approximately equal everywhere.

A Gu cycle working medium should possess the feature that its phase transformation latent heat should be as great as possible while the single phase specific heat should be as small as possible and that the specific volume of the saturated steam is required to be as small as possible. Besides, it is required for the Gu cycle working medium that its extent of temperature variation should match the requirements of Gu cycle thermodynamic engineering device during the phase transformation heat exchanging period. For example, for the refrigerating system shown in FIG. 7, the user requires the temperature of the cooled water to be reduced from $Tg$ to $Th$, the inlet temperature of the condensation water being $Te$, the engineering design requires the temperature difference between the inlet and outlet of condensation water to be $\Delta To$, therefore the outlet temperature of the condensation water is to be $Tf = Te + \Delta To$. In engineering, it requires the minimal heat exchange temperature difference for the heat exchanger to be $\Delta T$, so that the state of the phase transformation temperature variation of the optimum matching working medium must satisfy $Td = Te + \Delta T$, $Ta = Tf + \Delta T$, $Te = Th - \Delta T$, $Tb = Tg - \Delta T$. Here, the heat exchange process is called the optimum matching heat exchange process and such a working medium is referred to as the optimum matching working medium that satisfies the requirements of the user's thermodynamic engineering device. For the refrigerating and air-conditioning system, it is also called the optimum matching refrigerant. Though working media (or refrigerants) in which $Ta$, $Tb$, $Tc$, $Td$ strictly satisfy the above equations are hardly available, yet a Gu cycle working medium should satisfy the above equations as closely as possible.

Obviously, when the working temperature range of the user's thermodynamic engineering device is different, the optimum working medium required is also different. After many years of research, the inventor has found several working media (refrigerants) which can fulfil refrigerating and air-conditioning conditions and match the requirements of Gu cycle refrigerating and air-conditioning devices. Six refrigerants will now be described and it should be noted that they are all non-azeotropic mixtures, and are composed of at least three components of pure substances which are mixed together.

1. Mixture of R12/R22/R115/R13., Code No. GM1, the molecular formulae of the components are as follows: $CCl_2F_2$ for R12; $CHClF_2$ for R22; $CClF_2CF_3$ for R115 and $CClF_3$ for R13. In this mixture, the concentration range (weight concentration) for each component is as follows: 0.02 to 0.15, 0.45 to 0.68, 0.26 to 0.52 and 0.0 to 0.11 for R12, R22, R115 and R13 respectively. When this refrigerant is used in air-conditioning and refrigerating system, the performance coefficient of the system can be raised by more than 15%. Such a performance coefficient is defined as the refrigerating output quantity produced by unit power consumption of the air-conditioning and refrigerating system. When the mixture contains impurities with less than 0.1 of concentration, they will impair only little effect on the result of the refrigeration.

2. Mixture of R600a/R22/R152a/R13,. Code No. GM2, the molecular formulae of the components are as follows: $CH(CH_3)_3$ that is, isobutane for R600a, $CHClF_2$ for R22; $CH_3CHF_2$ for R152a and $CClF_3$ fpr R13. In this mixture, the respective concentration range (weight concentration) for each of the components is as follows: 0.08 to 0.36, 0.27 to 0.65, 0.08 to 0.43 and 0.0 to 0.17 for R600a, R22, R152a and R13, respectively. When this refrigerant is used in air-conditioning and refrigerating system, the performance coefficient of the system can be raised by more than 15%. When used in the refrigerating and air-conditioning system, the maximum permissible value for the concentration of the impurities contained in the mixture is 0.15.

3. Mixture of R600/R22/R152a/R13. Code No. GM3, the molecular formulae of the components are as follows: $CH_3CH_2CH_2CH_3$, that is, n-butane for R600; $CHClF_2$ for R22; $CH_3CHF_2$ for R152a and $CClF_3$ for R13. In this mixture, the concentration range (weight concentration) for each of the components is as follows: 0.08 to 0.38, 0.21 to 0.68, 0.08 to 0.47 and 0.0 to 0.16 for R600, R22, R152a and R13, respectively. When this refrigerant is used in refrigerating and air-conditioning system, the performance coefficient of the system can be raised by more than 15%. When used in the refrigerating and air-conditioning system, the maximum permissible value for the concentration of impurities contained in the mixture is 0.15.

4. Mixture of R600a/R22/R152a/R23, Code No. GM4. The molecular formulae of the components are as follows: $CH(CH_3)_3$, that is, isobutane, for R600; $CHClF_2$ for R22; $CH_3CHF_2$ for R152a and $CHF_3$ for R23. In this mixture, the concentration range (weight concentration) for each of the components is as follows: 0.09 to 0.43, 0.15 to 0.68, 0.08 to 0.52 and 0.0 to 0.2 for R600, R22, R152 and R23, respectively. When this refrigerant is used in refrigerating and air-conditioning system, the performance coefficient of the system can be raised by more than 15%. When used in the refrigerating and air-conditioning system, the maximum permissible value for the concentration of impurities contained in the mixture is 0.15.

5. Mixture of R600/R22/R152a/R23,. Code No. GM5, the molecular formulae of the components are as follows: $CH_3CH_2CH_2CH_3$ for R600; $CHClF_2$ for R22; $CH_3CHF_2$ for R152a and $CHF_3$ for R23. In this mixture the concentration range (weight concentration) for each component is as follow: 0.08 to 0.42, 0.21 to 0.69, 0.08 to 0.52 and 0.0 to 0.2 for R600, R22, R152a and R23, respectively. When this refrigerant is used in refrigerating and air-conditioning system the performance coefficient of the system can be raised by more than 15%. When maximum permissible value for the concentration of impurities contained in the mixture is 0.15.

6. Mixture of R12/R11/R113/R13 having mol concentrations of 0.2/0.3/0.4/0.1.

Here, the definition of impurities means any substances other than the above designated substances contained in the above mentioned mixture.

Scientists have discovered that some kinds of freon substances have a serious destructive effect to the ozonosphere in the atmosphere. So in the Montreal Protocol in 1987, regulations are provided calling for the restriction in the application of some kinds of freon that are most destructive to the ozonosphere in the atmosphere.

Some researches were also being carried out to study the extent of the destructive effect to the ozonosphere in the atmosphere caused by some of the freon substances. Definition for an ozone depletion potential (hereinafter referred as ODP) has been given which is to be used as a measurement of destruction to the ozonosphere in the atmosphere caused by various substances (including mixtures). Freon 11 was taken as a calibration standard whose ODP is defined as 1.0.

Based on the abovementioned definition of ozone depletion potential (ODP), the ODP of the aforesaid five Gu's cycle refrigerants have been theoretically deduced with their results obtained as follows: the ODP value of GM1 is less than 0.35; of GM2 less than 0.06; of less than 0.055; of GM4 less than 0.03 and of GM5 less than 0.03. Therefore, GM2, GM3, GM4, GM5 can be used as less ozonesphere destructive alternatives to the refrigerant R12.

Figure 8:
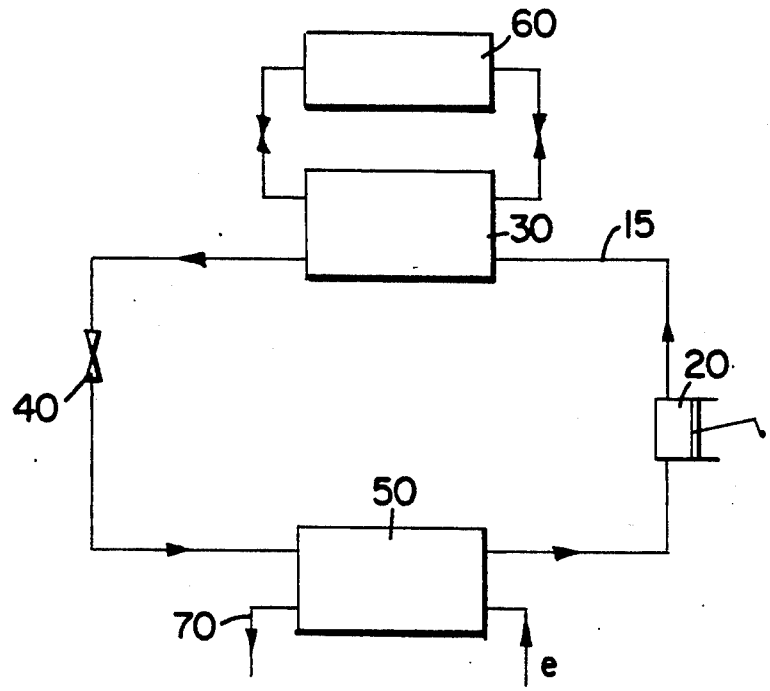
FIG. 8 is a schematic diagram of a refrigeration/cooling device for use with the embodiments of the present invention.

FIG. 8 is a schematic diagram of a refrigeration device in which a working medium of the present invention may be employed. The refrigeration device comprises a fluid circuit 15 in which the working medium circulates in the direction of the arrows. The fluid circuit interconnects a compressor 20, a condenser 30, a throttle 40 and an evaporator 50. The condenser 30 is connected, via a heat exchanger to a heat removing means, for example a cooling water supply 60. The evaporator 50 may be provided in a controlled space for removal of heat from that space or may be connected via a heat exchanger to a low temperature fluid circuit 70 for providing cooling at a location spaced from the evaporator 50.

Figure 9:
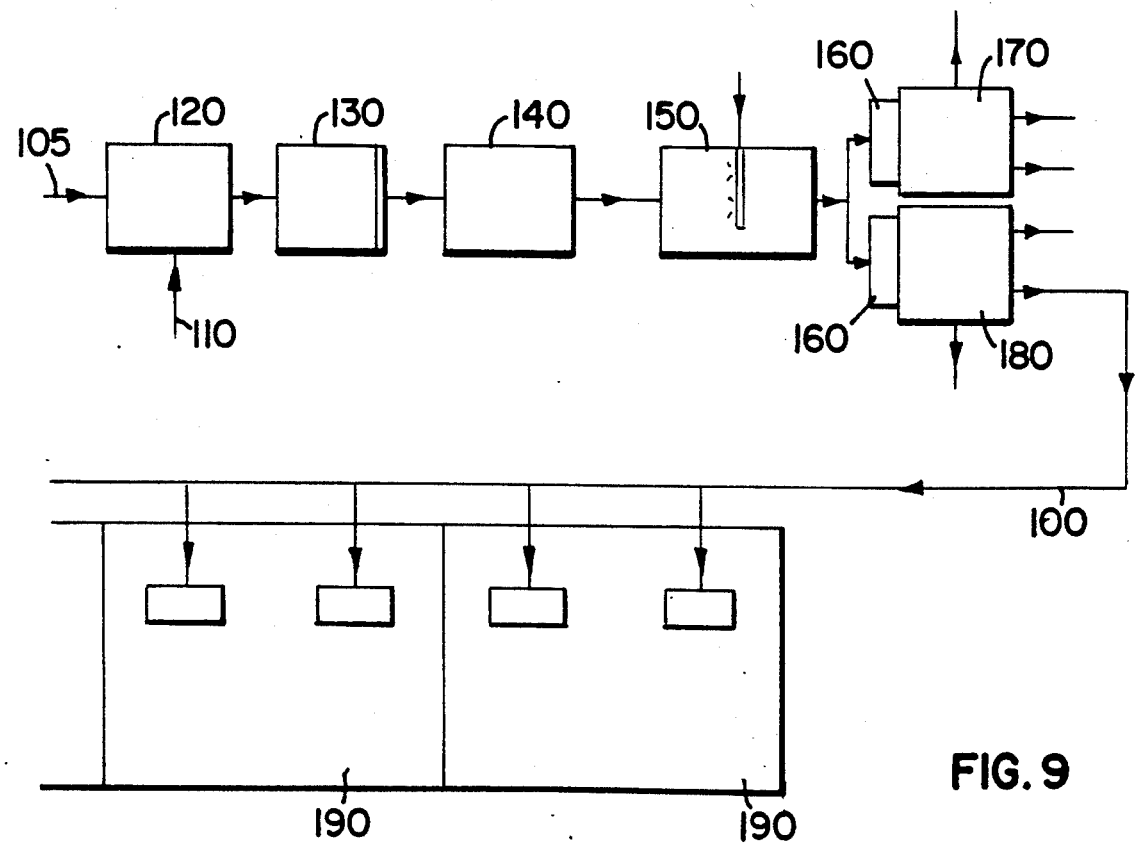
FIG. 9 is an air conditioning system incorporating the cooling device of FIG. 8.

An air-conditioning system including a refrigerating device as shown in FIG. 8 is shown in FIG. 9 and includes a fluid circuit 100. The circuit is provided with fresh air and recirculated air intakes 105, 110 which are mixed in a mixer 120, a fan and filter 130, a cooling/refrigerating device 140 of similar form to that shown in FIG. 8, a humidifier 150, zone heaters 160 connected to plenum chambers 170, 180 which each feed zoned compartments 190.

Whilst specific embodiments of the invention and refrigerating and air-conditioning systems for use therewith have been described, these are not to be construed as limitative, the scope of the invention being defined by the appended claims.

I claim:

1. A refrigerant being a mixture composed of dichlorodifluoromethane/trichlorofluoromethane/trichlorotrifluoroethane/chlorotrifluoromethane having mol concentrations of 0.2/0.3/0.4/0.1, in which the isobaric phase transformation curves for the refrigerant are non-parallel with each other in the temperature entropy diagram.

2. A refrigerant being a mixture composed of isobutane/chlorodifluoromethane/1,1-difluoroethane/chlorotrifluoromethane, with the weight concentration of each component being: 0.08 to 0.36 for isobutane, 0.27 to 0.65 for chlorodifluoromethane, 0.08 to 0.43 for 1,1 difluoroethane and 0.0 to 0.17 for chlorotrifluoromethane, and the maximum concentration of impurities in the mixture less than 0.15, and in which the isobaric phase transformation curves for the refrigerant are non-parallel with each other in the temperature entropy diagram.

3. A refrigerant being a mixture composed of n-butane/chlorodifluoromethane/1,1-difluoroethane/-chlorotrifluoromethane, with the weight concentration of each component being: 0.08 to 0.38 for n-butane, 0.21 to 0.68 for chlorodifluoromethane, 0.08 to 0.47 for 1,1-difluoromethane and 0.0 to 0.16 for chlorotrifluoromethane, and the maximum weight concentration of impurities in the mixture being less than 0.15, and in which the isobaric phase transformation curves for the refrigerant are non-parallel with each other in the temperature entropy diagram.

4. A refrigerant being a mixture composed of isobutane/chlorodifluoromethane/1,1-difluoroethane/trifluoromethane, with the weight concentration of each component being: 0.09 to 0.43 for isobutane 0.15 to 0.68 for chlorodifluoromethane, 0.08 to 0.52 for 1,1-difluoromethane, and 0.0 to 0.2 for trifluoromethane, and the maximum concentration of impurities in the mixture being less than 0.15 , and in which the isobaric phase transformation for the refrigerant are non-parallel with each other in the temperature entropy diagram.

5. A refrigerant being a mixture composed of n-butane/chlorodifluoromethane/1,1-difluoroethane/trifluoromethane with the weight concentration of each component being: 0.08 to 0.42 for n-butane, 0.21 to 0.69 for chlorodifluoromethane, 0.08 to 0.52 for 1,1-difluoroethane, and 0.0 to 0.2 for trifluoromethane, and the maximum concentration of impurities in the mixture being less than 0.15, and in which the isobaric phase transformation curves for the refrigerant are non-parallel with each other in the temperature entropy diagram.

* * * * *

UNITED STATES PATENT AND TRADEMARK OFFICE
CERTIFICATE OF CORRECTION

PATENT NO. : 5,049,296

DATED : September 17, 1991

INVENTOR(S) : CHUGUN GU

It is certified that error appears in the above-identified patent and that said Letters Patent is hereby corrected as shown below:

Column 2, lines 35-37, for ""A heat-power cycle for electricity generation from hot water with non-azeotropic mixtures", Energy vol. 13 No. 6 pp 529-536 1988" read --"A Heat-power Cycle for Generation from Hot Water with Non-azeotropic Mixtures," Energy, Vol. 13, No. 6, pp. 529-536, (1988)--.

Column 3, lines 19 and 20, for "temperatures" read --temperature--.

Column 3, line 48, for "is" read --and--.

Column 3, lines 57 and 58, for "a straight curved" read --straight or curved--.

Column 4, line 30, for "fulfil" read --fulfill--.

Column 4, line 44, insert --the-- after "in".

Column 4, line 56, for "fpr" read --for--.

Column 4, line 61, insert --the-- after "in".

Column 5, line 7, insert --the-- after "in".

Column 5, line 21, insert --the-- after "in".

Column 5, line 34, insert --the-- after "in".

Column 5, line 60, for "abovementioned" read --above mentioned--.

Column 5, line 37, insert --the-- after "When".

Column 5, line 64, insert --GM3-- after "of".

Column 5, line 67, for "ozonesphere" read --ozonosphere--.

Column 6, line 9, insert --,-- after "example".

Column 6, line 42, for "1,1" read --1,1- --.

Column 6, lines 42 and 43, for "chlorotriflouromethane" read --chlorotrifluoromethane--.

UNITED STATES PATENT AND TRADEMARK OFFICE
CERTIFICATE OF CORRECTION

PATENT NO. : 5,049,296

DATED : September 27, 1991

INVENTOR(S) : CHUGUN GU

It is certified that error appears in the above-identified patent and that said Letters Patent is hereby corrected as shown below:

```
Column 6, line 53, for "difluoromethane" read --difluoroethane--.

Column 6, line 64, for "difluoromethane" read --difluoroethane--.
Column 6, line 67, insert --curves-- after "transformation".
```

Signed and Sealed this

Twenty-third Day of March, 1993

Attest:

STEPHEN G. KUNIN

*Attesting Officer*     Acting Commissioner of Patents and Trademarks